US008845166B2

(12) United States Patent
Lederer

(10) Patent No.: US 8,845,166 B2
(45) Date of Patent: Sep. 30, 2014

(54) WASHABLE RECHARGEABLE ELECTRONIC CANDLE

(76) Inventor: Gabor Lederer, Clifton, NJ (US)

( * ) Notice: Subject to any disclaimer, the term of this patent is extended or adjusted under 35 U.S.C. 154(b) by 29 days.

(21) Appl. No.: 13/491,198

(22) Filed: Jun. 7, 2012

(65) Prior Publication Data

US 2013/0329406 A1 Dec. 12, 2013

(51) Int. Cl.

| | |
|---|---|
| ***F21V 5/00*** | (2006.01) |
| ***F21V 29/00*** | (2006.01) |
| ***F21V 25/00*** | (2006.01) |
| ***F21V 31/00*** | (2006.01) |
| ***F21L 4/00*** | (2006.01) |
| ***F21L 13/00*** | (2006.01) |
| ***H02J 7/00*** | (2006.01) |
| ***F21L 4/08*** | (2006.01) |
| ***F21S 6/00*** | (2006.01) |
| ***F21V 17/00*** | (2006.01) |
| *F21S 9/02* | (2006.01) |
| *F21V 23/04* | (2006.01) |
| *F21Y 101/02* | (2006.01) |
| *F21W 121/00* | (2006.01) |

(52) U.S. Cl.

CPC .... *F21L 4/08* (2013.01); *F21S 9/02* (2013.01); *F21V 23/0485* (2013.01); *F21Y 2101/02* (2013.01); *F21S 6/001* (2013.01); *F21W 2121/00* (2013.01); *F21V 17/002* (2013.01)

USPC .......................................................... 362/569

(58) Field of Classification Search

CPC ....... F21V 35/00; F21Y 2101/02; F21K 9/00; F21L 4/08; F21L 2/00; F21S 6/001; F21S 10/04

USPC ......... 362/158, 184, 185, 186, 569, 810, 392, 362/101, 183, 267; 320/115

See application file for complete search history.

(56) References Cited

U.S. PATENT DOCUMENTS

| | | | | |
|---|---|---|---|---|
| 4,029,954 | A * | 6/1977 | Moyer | 362/183 |
| 4,764,853 | A * | 8/1988 | Thomas et al. | 362/183 |
| 5,172,031 | A * | 12/1992 | Matsui et al. | 315/129 |
| 5,282,116 | A * | 1/1994 | Shiau | 362/205 |
| 5,909,954 | A * | 6/1999 | Thomas | 362/307 |
| 6,851,827 | B2 * | 2/2005 | Clemente et al. | 362/158 |
| 7,011,426 | B2 * | 3/2006 | Gabor | 362/161 |
| 7,591,569 | B1 * | 9/2009 | Little | 362/311.13 |
| 2001/0033488 | A1 * | 10/2001 | Chliwnyj et al. | 362/231 |
| 2005/0254248 | A1 * | 11/2005 | Lederer | 362/392 |
| 2007/0223217 | A1 * | 9/2007 | Hsu | 362/183 |
| 2007/0291475 | A1 * | 12/2007 | Heathcock | 362/157 |
| 2008/0117633 | A1 * | 5/2008 | Li | 362/253 |

(Continued)

*Primary Examiner* — Peggy Neils
*Assistant Examiner* — Erin Kryukova
(74) *Attorney, Agent, or Firm* — Israel Nissenbaum; Yitzy Nissenbaum

(57) ABSTRACT

A washable, rechargeable electronic candle, with peripheral elements and a charging system. The electronic candle module is provided with a hermetically closed switch, hermetic charging pad elements and seal between a translucent flame cover. An electronic lighting source is visibly contained within the flame cover and is preferably comprised of multiple spaced apart light sources such as of LED lighting elements in a configuration to thereby create a three-dimensional flame appearance. The flame cover is sized to protect the light sources and to provide light diffusion of the lighting source in the configuration of an ovate candle flame. In addition, an opaque element is provided on the candle body, just below the level of the lighting source to provide an emulative effect of a darkened wick section of a candle. Included is a modular electronic candle emulation system with interchangeable candle modules, charger, shade, decorative bases, and fragrance holders.

14 Claims, 9 Drawing Sheets

(56) References Cited

U.S. PATENT DOCUMENTS

2008/0151563 A1* 6/2008 Chen .............................. 362/392
2010/0117542 A1* 5/2010 Van Dyn Hoven ........... 315/149
2010/0124050 A1* 5/2010 Hau et al. ...................... 362/183
2011/0255272 A1* 10/2011 Privas ........................... 362/157

* cited by examiner

WASHABLE RECHARGEABLE ELECTRONIC CANDLE

FIELD OF THE INVENTION

This invention relates to electronic candles and particularly electronic candles used in food environments, such as in restaurants, health spas, hotels and hospitality sites, and entertainment industry uses. The invention particularly relates to features and uses currently unavailable with electronic candles, the absence of which has retarded further growth of electronic candle proliferation and use.

BACKGROUND OF THE INVENTION

Electronic candles are known, which generally emulate the appearance of flame candles by utilizing electronic or electronic circuitry in combination with light sources such as light emitting diodes (LEDs) to provide a flickering and moving light. Electronic and electric candles are similar to the extent that they emulate a candle flame with an electric current with electric candles often defined as providing a steady unvarying light emulation. As used herein, electronic candles usually utilize electronic circuitry to provide variations in current or optical variations to more closely emulate a candle flame.

The electronic candles have become increasingly popular because of their obvious benefits related to environmental and safety considerations. However, by replacing real flame candles, authenticity of appearance must be maintained in order to retain and advance consumer acceptance. Currently available electronic candles are however deficient in this regard especially in the environments in which they are most often utilized.

Many of these candles are used for aesthetic appearance where a candle lit ambiance, with subdued lighting is desired but without the inherent dangers of open flames. A primary utilization of flame candles and increasingly electronic candles is in restaurants, particularly with the serving of dinners. There are however, inherent problems with such utilization. It is important, for aesthetic reasons, that an electronic candle be as realistic as possible to avoid an impression of a cheap imitation of a flame candle. Candle lit dinners are the epitome of elegance with a mood being spoiled by artificial looking candles especially by rechargeable electronic candles. Various features of flame candles have however not been successfully emulated.

Visual requirements of electronic candles include the necessity of keeping them clean, especially because of their long-term usability (flame candles are generally used once or until an unused portion becomes unsightly and then discarded and replaced). As described above, it is a further requirement that the electronic candles create a real flame appearance, including a real candle flame shape and randomness in an enclosure, rather than just a steady or simple blinking light effect, which constitutes the appearance of many current electric and electronic candles. The appearance emulation further includes candle shape and color suitable for the ambience of a particular environment. This is especially relevant if a partial or fully candle body is visible in a fixture, Other desired features include the emission of a fragrance of real candles or that of environmental aromas, at the user's discretion (e.g., scented candle emulation), ease of turning the candle on or off and the space minimization of charging fixtures. Presently available electronic candles are generally inadequate in many of the above regards.

In addition to appearance considerations, while the electronic candle is lit, the presence of food and food handlers, including the presence of various liquids, in restaurant environments, present cleaning problems with respect to reusable electronic candles. Real candles can simply be discarded and the candle holders washed, or otherwise cleaned. However, electronic candles, with contained electronic circuitry can be damaged by normal cleaning expedients. Though there have been electronic candles which are nominally considered to be waterproof, they often are not configured to be aesthetically emulative of flame candles. Furthermore, they are also usually not structured for maintaining waterproof capability under severe and repeated use or are overly costly. This is particularly true with respect to controls, supply of charging power and use of switching elements, which need to translate outside control movement and operative functions through a sealed wall. Many of such electronic candles therefore have fully contained primary or non-rechargeable batteries and are not adapted to be used with external ports for engagement with chargers.

SUMMARY OF THE INVENTION

It is an object of the present invention to provide a rechargeable electronic candle module capable of being washed and cleaned and which comprises elements to enhance the realistic appearance and emulation of the flame candle appearance.

It is a further object of the present invention to provide the electronic candle module with an unobtrusive water resistant or hermetic easy access on/off and mode switch of the electronic candle.

Another object of the present invention is the facility in providing user, decorator or interior designer options and selections such as variations in candle body color and the providing of fragrances, within compartments, which do not detract from the visual appearance of the electronic candle module and its real flame candle emulation.

It is yet another object of the present invention to provide a rechargeable electronic candle module configured for engagement with a base charger, with a positive engagement, whereby the electronic candle remains constantly powered regardless of charger position or location or any attendant vibrations (e.g., on vehicles or cruise ships). The base charger can be positioned at any angle or even upside down to take advantage of available space and low ceiling applications. Candle modules of various configurations and designs are modularly configured to be interchangeably utilized with add on components such as single and multiple unit chargers, decorative charging bases and the like.

It is still yet another object of the present invention to provide a modular candle emulation system with an hermetically or waterproof sealed candle emulation element, a charging/decorative base and a modular and interchangeable decorative cover or shade. Control switches and charging elements are otherwise inherently non-hermetic since they provide an operative function between an exterior and an interior of an item such as an electronic candle on/off switch and charging elements.

Generally the present invention comprises a washable or waterproof readily cleanable rechargeable electronic candle module element, with peripheral elements and a charging system. The electronic candle module is provided with a hermetically closed switch, hermetic charging pad elements and a hermetic seal between a translucent flame cover and an opaque candle body with different color options for the candle body. An electronic lighting source is visibly contained within the flame cover and is preferably comprised of multiple spaced apart light sources such as of LED lighting elements in a configuration to thereby create a three-dimensional flame appearance. The flame cover is preferably sized to protect the light sources and to provide light diffusion of the lighting source in the configuration of an ovate candle flame. In addition, an opaque element is provided on the candle body, just below the level of the lighting source to provide an emulative effect of a darkened wick section of a candle. The invention further comprises a modular electronic candle emulation system with interchangeable candle modules, charger, shade, decorative bases, fragrance holders and the like The washable, readily cleanable rechargeable electronic candle module comprises:

a candle module body containing an electronic circuit and control element and a rechargeable battery for lighting control and powering of the electronic candle;

an electronic power and control switch on the candle module body;

at least one charging element configured to permit electronic charging of the rechargeable battery by an external power source; and a light source configured to provide candle lighting emulation.

The light source extends from the candle module body and is electronically connected to the electronic circuit and control element and the rechargeable battery. The light source is contained within a translucent cover element integrated with the candle module body. All of the electronic power and control switch, the at least one charging element and the translucent cover element are hermetically sealed to the candle module body, whereby water and external fluids are prevented from entering the candle module body and translucent cover element. The rechargeable electronic candle module is accordingly capable of being washed and cleaned without damage to components thereof.

The above and other objects, features and advantages of the present invention will become more evident from the following discussion and drawings in which:

SHORT DESCRIPTION OF THE DRAWINGS

Figure 5A:
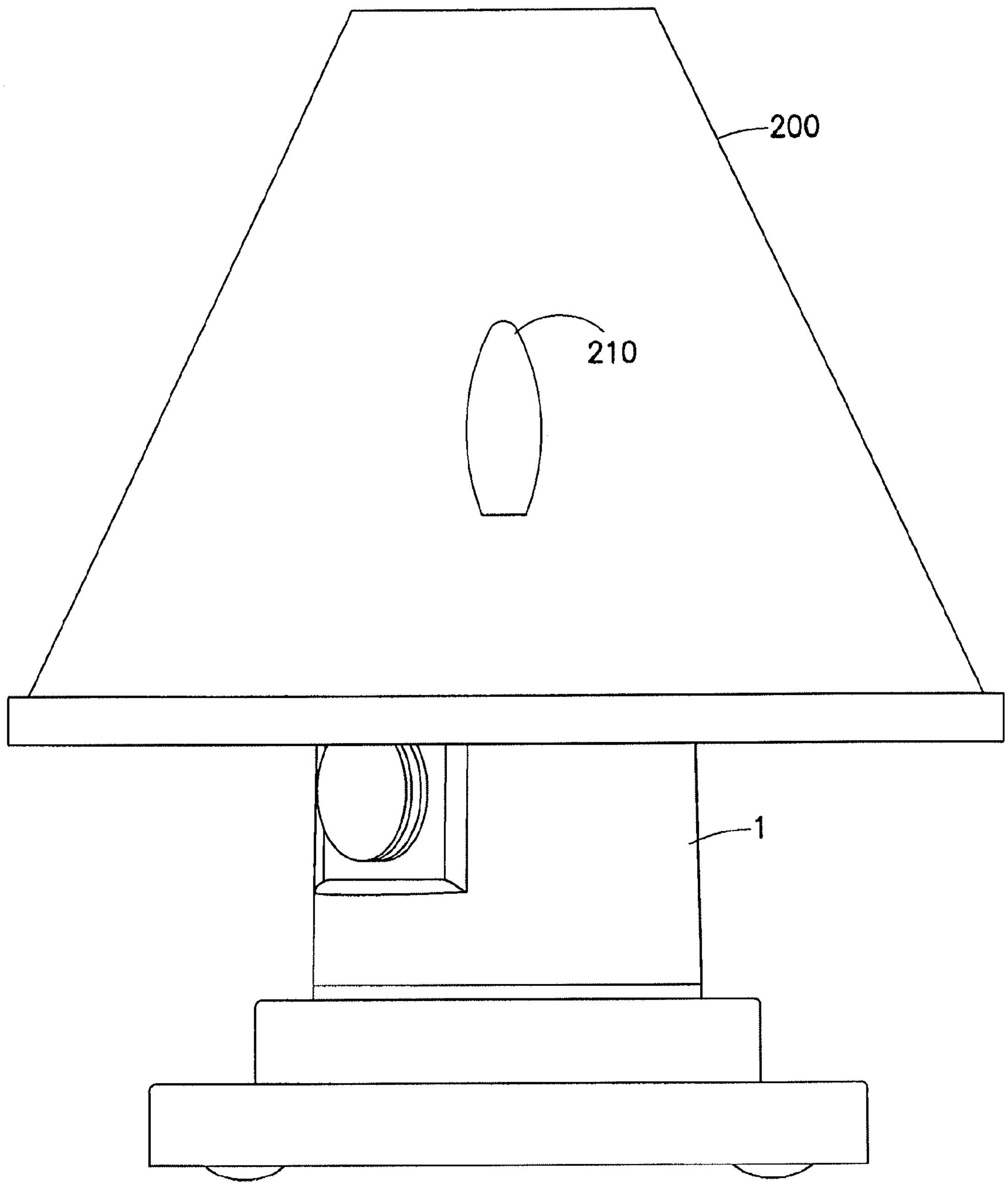
Figure 5B:
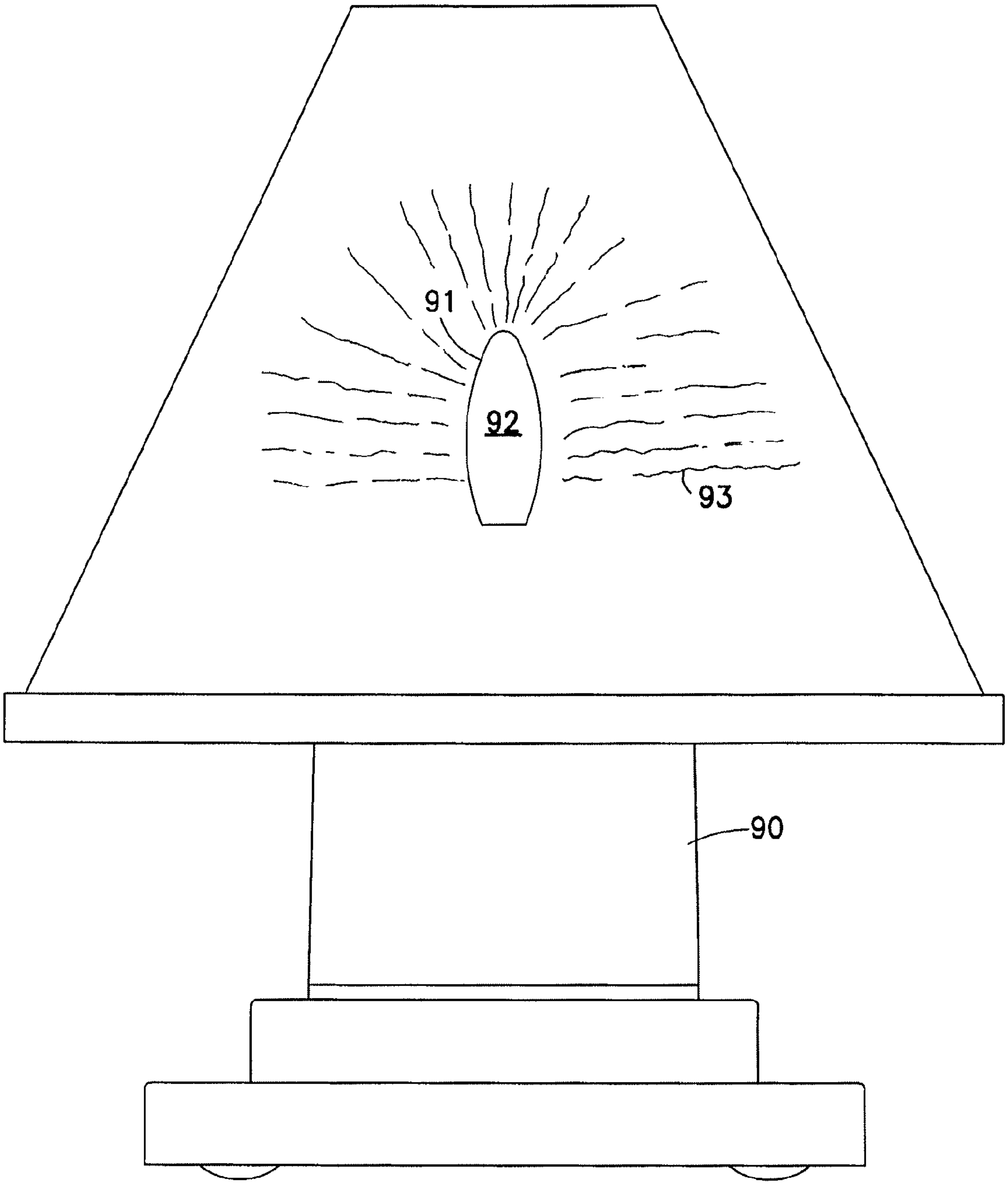
FIG.5B PRIOR ART
Figure 6:
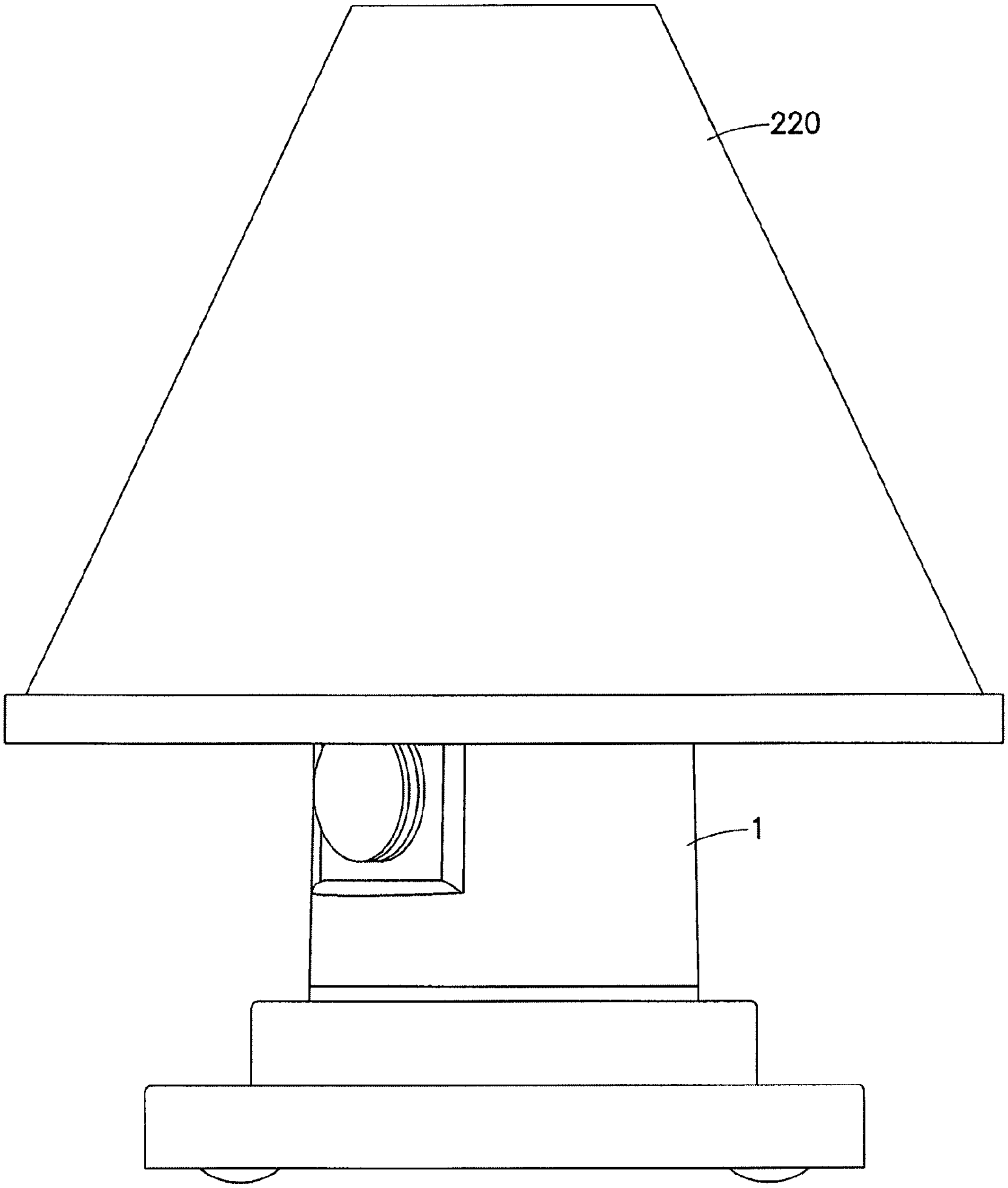
Figure 6A:
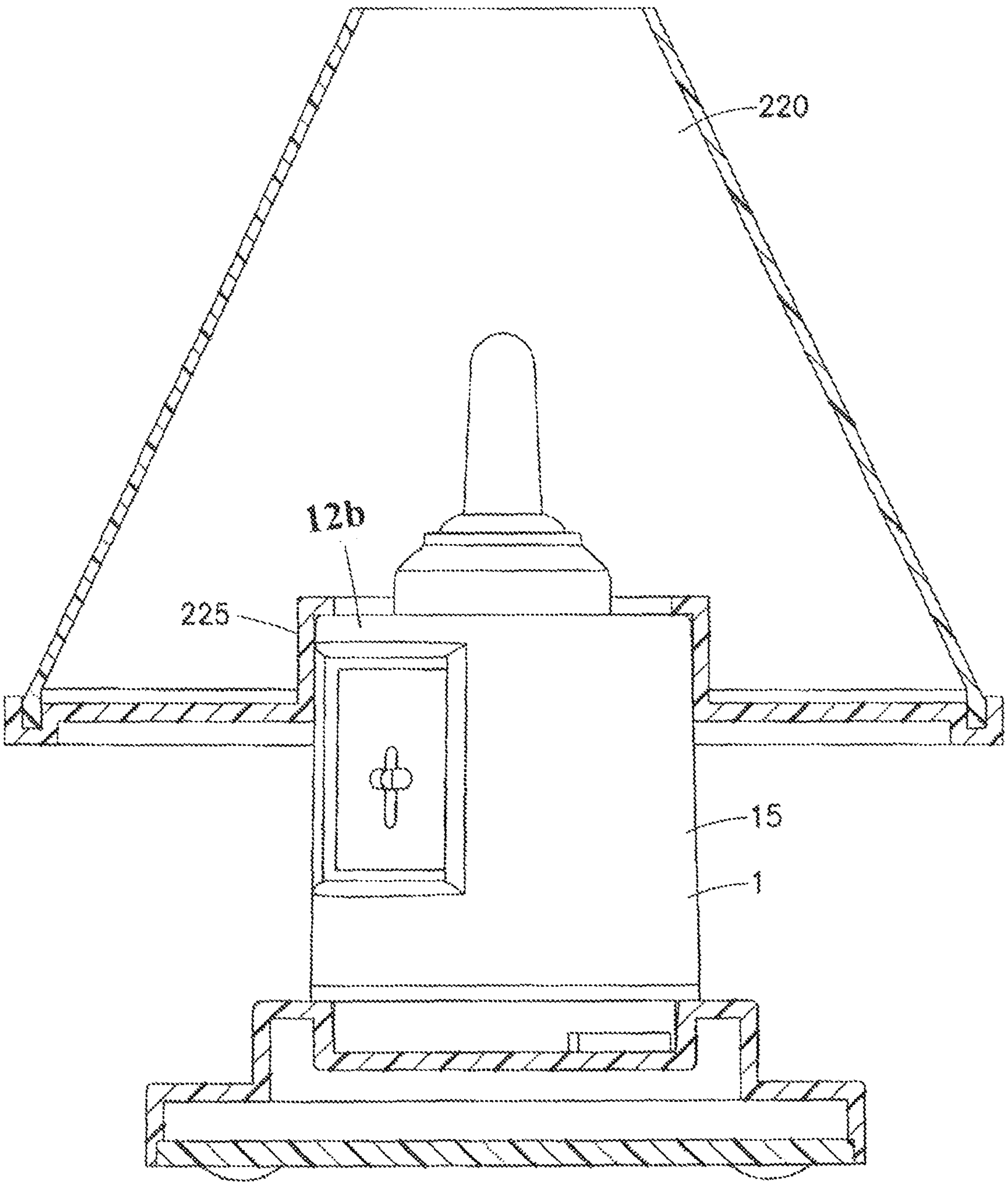

FIG. 5A is a depiction of the candle lighting emulation of the electronic candle of the present invention with a translucent cover with FIG. 5B being a view of a typical prior art electronic candle with a depiction of the visible candle lighting emulation through a translucent cover with; and FIGS. 6 and 6A depicting a modular lampshade on the electronic candle module of FIG. 1 and a cross sectional view thereof respectively.

DETAILED DESCRIPTION

In a preferred embodiment, the washable electronic candle module includes an electronic power and control switch, which comprises a touch control switch electronically integrated with the electronic circuit and control element and rechargeable battery. The touch control switch has a portion thereof, which extends through and beyond a wall of the candle module body. This switch portion is covered by a deflection element, with the deflection element being hermetically sealed to the candle module body around the extending portion of the touch control switch. As a result, depression of the deflection element activates control of the touch control switch. For aesthetics and convenience, the switch control is preferably positioned on a side peripheral section of the candle module body.

The charging element of the candle module preferably comprises two conductive elements electronically connected to the rechargeable battery. The conductive elements extend through the candle module body and are configured for external electronical contact with a charging device, with the conductive elements being hermetically sealed to the candle module body.

In a further preferred embodiment, which permits the candle modules to positioned nearly anywhere, the conductive elements extend through the base of the candle module body with the base of the candle module body comprising a releasable locking element configured for locking engagement and disengagement with the charging device. The locking element is configured to effect electronical charging contact between the conductive elements and the charging device when the locking element is in a locked engaged position. The charging base can then be attached to any surface for holding the candle module in position.

In a preferred decorative embodiment, the charging device is configured to ornamentally remain on the base of the candle module body to provide an ornamental stand for the washable electronic candle module.

Figure 1A:
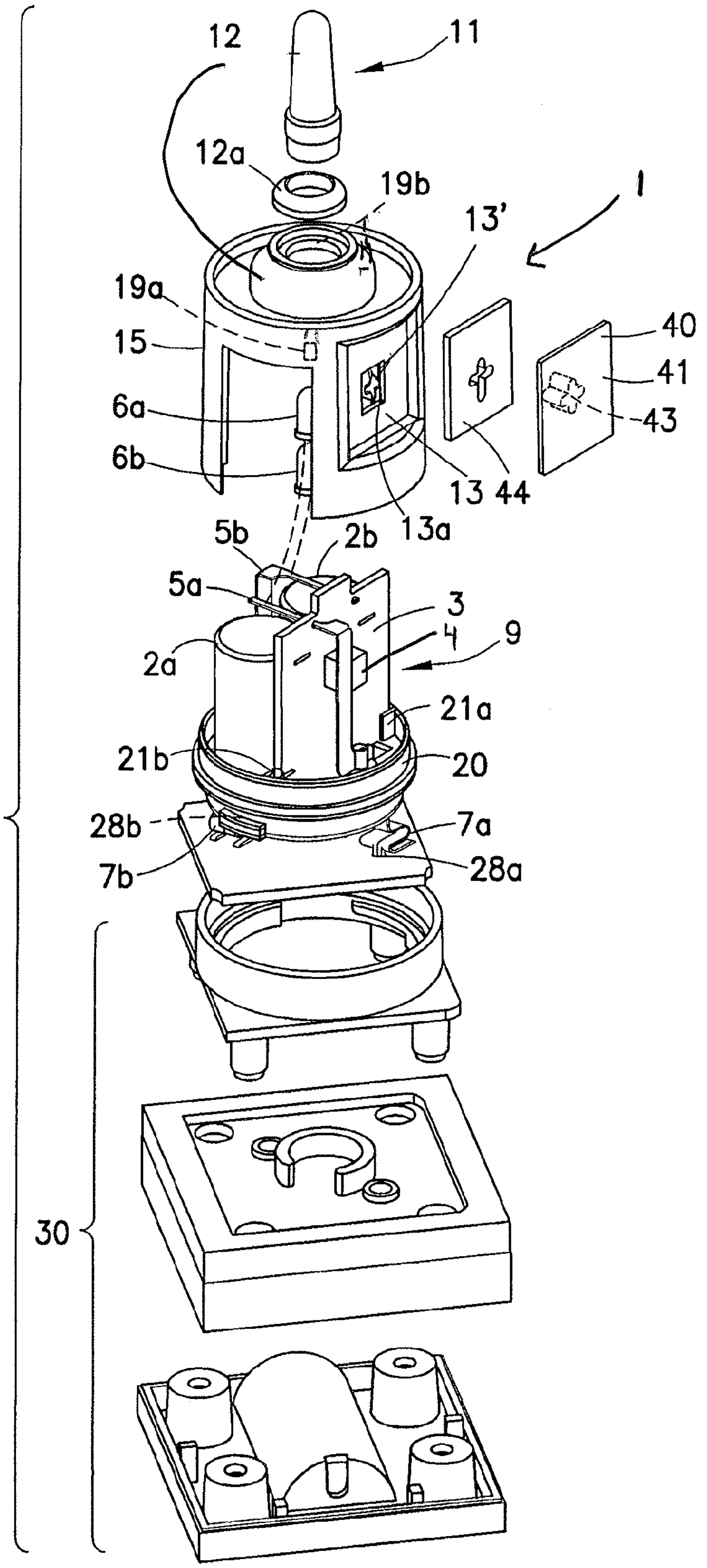
FIG. 1A is an exploded view of the electronic candle module of the present invention with deflecting switch and single unit charger/power supply.
Figure 1C:
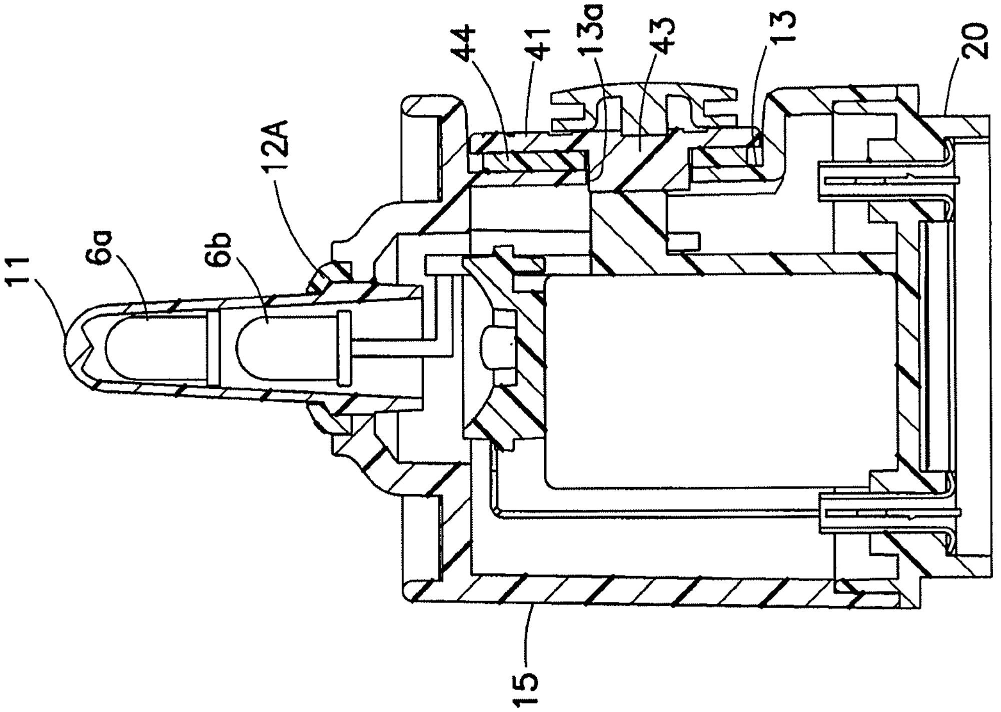
FIG. 1C is an interior cross section view of the candle module of FIG. 2B through the deflection switch and seating base, when co-fitted.
Figure 1B:
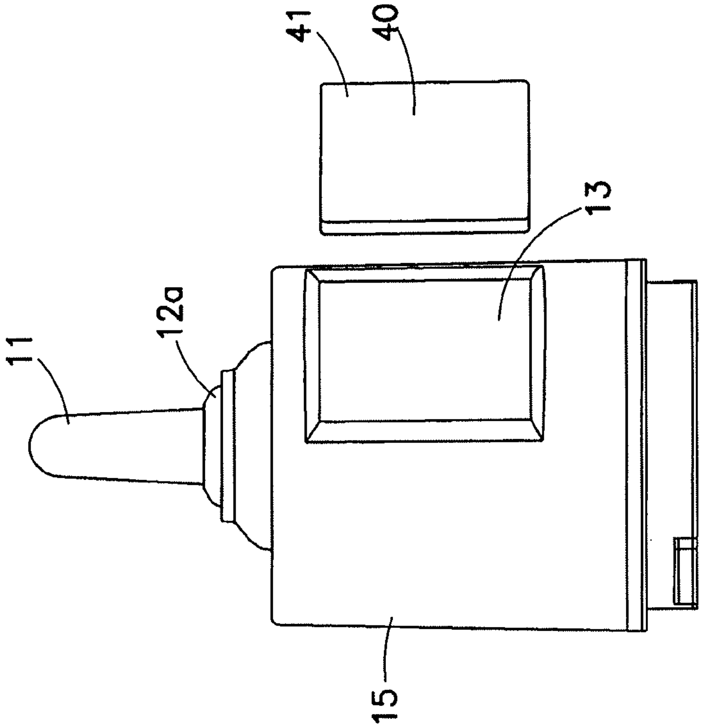
FIG. 1B is a side view of the assembled electronic candle module of FIG. 1A with separated deflection switch for positioning.

With reference to the drawings and FIGS. 1A-C, FIG. 1A is an exploded view of electronic candle 1 with its component parts including charger base stand 30. The interior operative components of the candle (electronic assembly 9) are shown as control circuit board 3 integrally fixed to and electronically connected to power supplying rechargeable batteries or cells 2*a* and 2*b*, via electronical connection elements 5*a* and 5*b* respectively. The circuit board is further electronically integrated with candle flame emulating LEDs 6*a* and 6*b* and touch switch 4. Rechargeable batteries 2*a* and 2*b* are connected via conductors 7*a* and 7*b* respectively to charging contact pads 8*a* and 8*b* (shown in FIG. 2A).

The electronic assembly 9 is seated in a specific fixed position on base element 20 via insertion of the lower end corners of the circuit board 3 into close fitting channels 21*a* and 21*b*. The upper end corners of the circuit board fit into corresponding close fitting channels 19*a* and 19*b* of cylindrical case 15. Conductors 7*a* and 7*b* extend through apertures 28*a* and 28*b* and terminate in conductive pads 8*a* and 8*b* seated in the apertures 28*a* and 28*b* respectively (as seen in FIG. 2A).

Cylindrical case 15 is configured to enclose the electronic assembly 9 and to be hermetically sealed to base element 20. Translucent flame section 11 extends from the case 15 and through conical section 12 and serves to closely enclose candle flame emulating LEDs 6*a* and 6*b*. Opaque ring 12*a* is seated at the top of the conical section 12. As shown in the cutaway section of FIG. 4, flame section 11 is a separable element hermetically sealed to case 15. LEDs 6*a* and 6*b* are vertically stacked within the flame section 11 with the base of lower LED 6*b* below the area of illumination being peripherally enclosed by the opaque ring 12*a*. This effectively blocks light from emanating from the peripherally enclosed area thereby realistically emulating the darkened wick area of a flame candle. Trough area 12*b* surrounds the conical section and is suitable for containment of aromatic liquids.

Control switch area 13 of case 15 is shown as a rectangular depression with a planar base in the outer wall of case 15. A shown in FIG. 1A, a horizontally asymmetrical cross through cut 13*a*, is formed in the planar base 13' thereof and configured to be aligned with touch switch 4 on the control circuit board 3. The deflection or membrane switch element 40, shown in FIG. 1A is a plastic rectangle 41 of outer dimension sized relative to the rectangular depression 13 for a close fit therewithin. The thickness of plastic rectangle 41 is less than the depth of depression 13 to prevent or retard disengagement of the rectangle from the depression 13, when positioned therewithin, and to provide a tactile recognizable area. The plastic rectangle 41 further comprises an integral cross shaped boss 43 configured to closely fit into cross through cut 13*a*, with the asymmetrical difference between the upper and lower cross segments serving as a key to ensure properly aligned placement of the plastic rectangle 41 within rectangular depression 13. An adhesive coated compressible air cell foam 44 is adhered to the plastic rectangle 41 around the boss 43. The adhesive on foam 44 anchors the plastic rectangle 41 to the base 13' and helps to seal the periphery of the cross through cut 13*a*. Plastic rectangular 41 functions as a deflection switch to activate touch switch 4 to an on/off control and into various lighting modes. Finger pressure on rectangle 41 causes it to flex inwardly whereby boss 43 protrudes slightly through cut 13*a* and into aligned momentary contact with touch switch 4 to provide the operative controls in an unobtrusive and hermetically sealed manner (see FIG. 1C). Alignment of the switch 4 with boss 43 is effected by means of the fixed anchoring of the circuit board 3 within the upper and lower retaining channels 21*a*, 21*b* in base 20 and 19*a*, 19*b* on case 15. In a preferred embodiment, the switch is configured to cycle through the modes of fast flicker (for candles positioned to be seen at a distance), slow flicker (for candles positioned to be seen at a close proximity), steady light (for use in constant lighting conditions such as a night light) and off. The order of the modes may vary and additional modes, such as increased illumination intensity and the like may be further included.

Figure 2A:
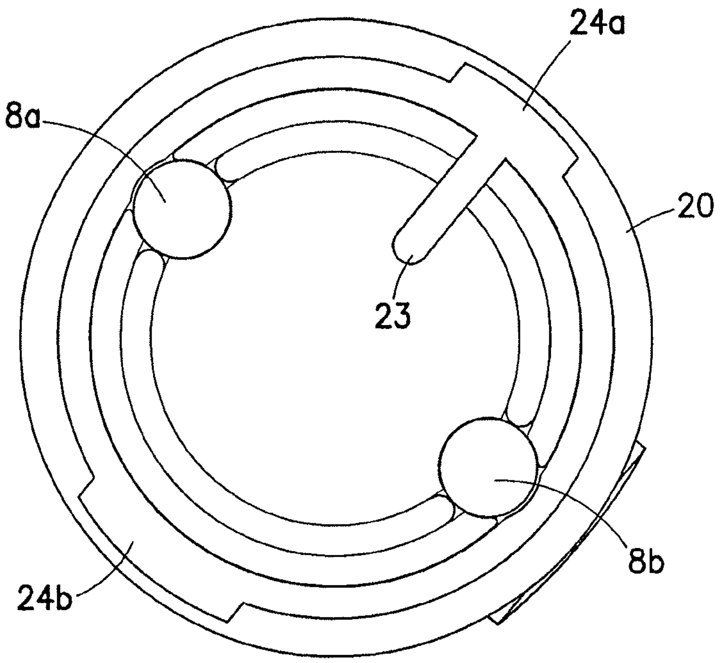
FIG. 2A is a bottom view of the base of the electronic candle module with FIG. 2B, being a top view of the co-fitting, locking charger/power supply with positional charging switch element.
Figure 2B:
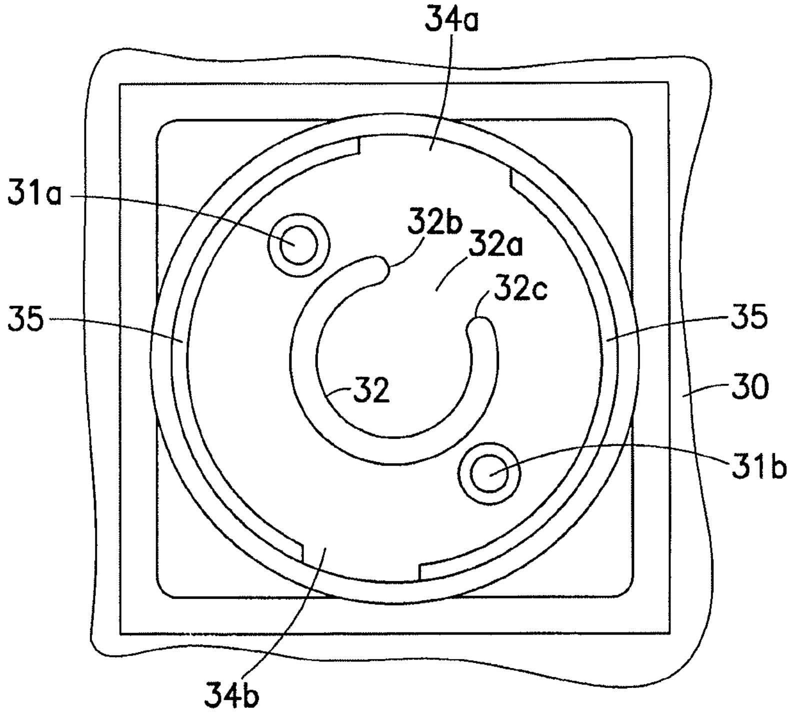

The base 20 of candle 1, is shown in FIG. 2A as having elevated apertures 28*a* and 28*b* into which conductive pads 8*a* and 8*b* are hermetically sealed. The pads 8*a* and 8*b* have planar surfaces for charging connection with spring-loaded charging elements 31*a* and 31*b* respectively of charger 30, shown in FIG. 2B. Charging engagement between the electronic candle 1 and the charger 20 is positively effected by keyed fitting of candle base sections 24*a* and 24*b* (with different sizes to ensure proper orientation) into corresponding cutouts 34*a* and 34*b* of charger 30. Turning of candle base 20 relative to the charger 30 causes candle base sections 24*a* and 24*b* to fit within circular undercut 35 and to be positively held thereby in a bayonet type mounting connection. Rotational movement and positional control between the candle base and the charger is effected between initial insertion connection and a locking stop, into the position wherein conductive pads 8*a* and 8*b* electronically contact spring loaded charging elements 31*a* and 31*b*. This positional control is effected by engagement between straight ridge 23 of base 20 and circular ridge 32 with an arc cutout 32*a*. Straight ridge 23 laterally engages circular ridge end 32*b*, as a terminal stop, when candle base sections 24*a* and 24*b* are in alignment with cutouts 34*a* and 34*b* at initial engagement or at removal of charger from candle. Ridge 23 laterally engages circular ridge end 32*c* as a second terminal stop, when the pads 8*a* and 8*b* are brought into direct electronic contact with charging elements 31*a* and 31*b*.

Figure 3:
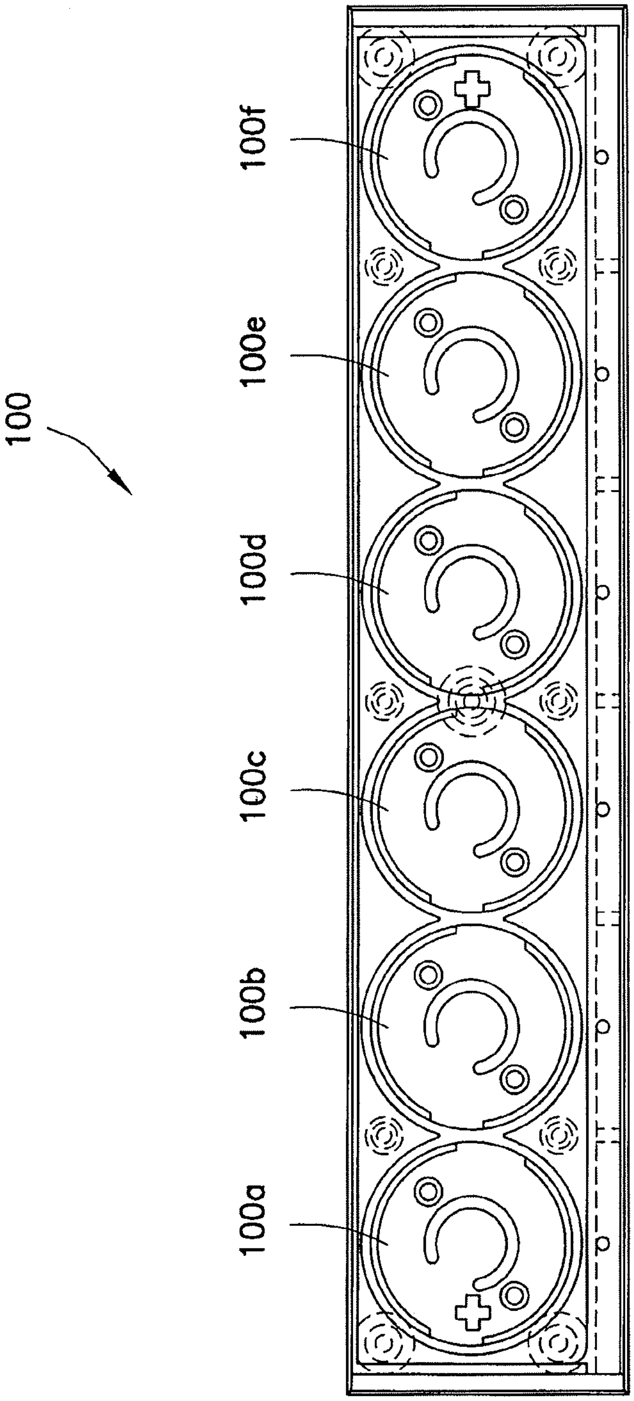
FIG. 3 is a top view of a multiple charger unit.

Engagement between charger and base is a positive locking one, independent of position or of gravitational considerations. The charger can thus be positioned anywhere, conveniently available, including walls, ceilings, under cabinets and the like. In addition, with the locking engagement, the charger can readily be used as a decorative stand for constant powering of the candle. FIG. 3 depicts a multi-charge station 100 with six units 100*a-f*, each of which is essentially identical to candle engaging and charging elements of the charger 30 of FIG. 2B.

Figure 4:
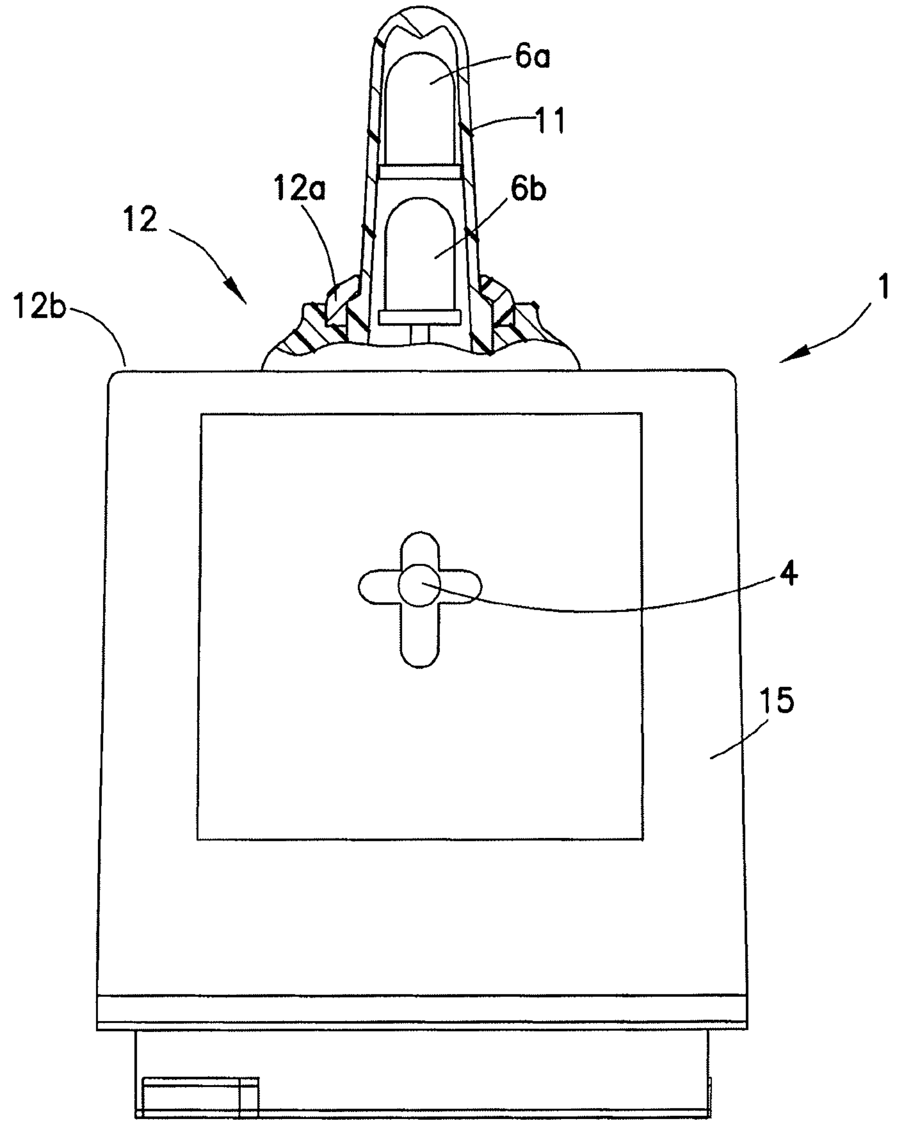
FIG. 4 is a front view of the candle module with cutaway section showing the seating and connection of the flame cover with the candle base.

FIG. 4 shows a cutaway section of the candle 1, showing the positioning of the LEDs 6*a* and 6*b* within flame element 11 in dotted line and wherein the flame element is hermetically sealed to the case 15. Since the flame element 11 and the case 15 are separate elements they may be decoratively varied in color, if desired. As shown, the base of lower LED 6*b* is encircled by opaque ring 12*a* at a point just below the light emitting section of the LED 6*b*. This provides the darkening below the flame emulation to further emulate the darkening section of a wick in a flame candle.

A decorative translucent cover 200 is shown in FIGS. 5A and 5B as placed over the candle 1 of the present invention and that of prior art electronic candle 90 respectively. The visible flame 210 in FIG. 5A is the typical ovate shape as normally seen with flame candles. The flame 91 of the prior art candle is that of a sharp illumination area 92 surrounded by a diffused glow 93. The difference in appearance is attributable to the close encircling of the LEDs 6*a* and 6*b* by translucent flame element 11, which retards diffusion. In contrast, prior art electronic candles typically have broad conical flame covers which results in diffusion and reduced realistic flame emulation of flame candles.

As shown in FIGS. 6 and 6A, a removable modular translucent lamp shade 220 is shown as being seated on candle 1, with lamp shade 220 having a short cylindrical interior base 225 configured to engage and be seated on the case 15 and closely configured to fittingly engage the sides of trough 12*b* but without covering and preventing the aromatization of an aroma substance contained in the trough from permeating into the surrounding area.

In the preferred modular system of the present invention modular candle elements, while decoratively varied, maintain similar dimensions such that the modular peripheral elements, such as the aforementioned shades, covers and charging stands are interchangeable with connection with each other.

It is understood that the above describe and drawings are merely exemplary of the candle emulation modules of the present invention and peripheral operational and decorative attachments and that changes may be made to the components and structure including additional elements, without departing from the scope of the present invention as defined in the following claims.

What is claimed is:

1. A washable, readily cleanable rechargeable electronic candle module comprising:

a candle module body containing an electronic circuit and control element and a rechargeable battery for lighting control and powering of the electronic candle;

an electronic power and control switch on the candle module body;

at least one charging element configured to permit electronic charging of the rechargeable battery by an external power source; and a light source configured to provide candle lighting emulation, extending from the candle module body and electronically connected to the electronic circuit and control element and the rechargeable battery, the light source being contained within a translucent cover element integrated with the candle module body, wherein the electronic power and control switch, the at least one charging element and the translucent cover element are hermetically sealed to the candle module body, whereby water and external fluids are prevented from entering the candle module body and translucent cover element, whereby the rechargeable electronic candle module is capable of being washed and cleaned without damage to components thereof.

2. The washable electronic candle module of claim 1, wherein the electronic power and control switch comprises a touch control switch electronically integrated with the electronic circuit and control element and rechargeable battery, the touch control switch having a portion thereof which extends through and beyond a wall of the candle module body and which portion is covered by a deflection element, the deflection element being hermetically sealed to the candle module body around the extending portion of the touch control switch wherein depression of the deflection element activates control of the touch control switch.

3. The washable electronic candle module of claim 2, wherein the touch control switch is configured through the electronic circuit to toggle through relative speeds of lighting of slow blink of the light source, fast blink of the light source, continuous lighting of the light source, and turning off of the light source in a predetermined sequence.

4. The washable electronic candle module of claim 2, wherein the light source comprises at least two LED electronically-connected and vertically-stacked elements within the translucent cover element.

5. The washable electronic candle of claim 4, wherein the translucent cover element closely encircles the enclosed LED elements whereby light diffusion is retarded and an ovate appearing light is visible as a candle flame emulation.

6. The washable electronic candle of claim 5, wherein a base of a lower LED element of the vertically stacked-LED elements is encircled by an opaque ring at a point just below a light emitting section of the lower LED element to provide a darkened area below illuminated flame emulation of the vertically-stacked LED elements to thereby emulate a darkening section of a wick in a flame candle.

7. The washable electronic candle module of claim 2, wherein the candle module body is substantially cylindrical, with a planar section formed in a side wall of the cylinder, wherein the planar section is configured to have the touch control switch portion pass therethrough and wherein the deflection element is hermetically sealed to the planar section around the touch control portion which extends through the planar section.

8. The washable electronic candle module of claim 2, wherein the charging element comprises two conductive elements electronically connected to the rechargeable battery, which conductive elements extend through the candle module body and are configured for external electronic contact with a charging device, wherein the conductive elements are hermetically sealed to the candle module body.

9. The washable electronic candle module of claim 8 wherein the conductive elements extend through a base of the candle module body and wherein the base of the candle module body comprises a releasable locking element configured for locking engagement and disengagement with the charging device, the locking element being configured to effect electronic charging contact between the conductive elements and the charging device when the locking element is in a locked engaged position.

10. The washable electronic candle module of claim 9, wherein the base of the candle module body and the charging device are configured with an interlocking and removable bayonet configuration.

11. The washable electronic candle module of claim 9, wherein the charging device is configured to ornamentally remain on the base of the candle module body to provide an ornamental stand for the washable electronic candle module.

12. The washable electronic candle module of claim 11, wherein a shade element is removably mounted on an upper end of a cylindrical base wherein the shade element surrounds the light source in a lampshade configuration.

13. The washable electronic candle module of claim 1, wherein an upper portion of the candle module body is configured with a trough for the containment of an aromatic scent material.

14. A modular electronic candle system comprising:

at least two electronic candle modules of claim 1, a modular multiple charging base having at least two charging positions each of which is configured to be removably interlocked with any of the electronic candle modules for the separate charging of the rechargeable batteries in each of the electronic candle modules, at least two modular shade elements configured to be removably mounted on any of the electronic candle modules to emulate the appearance of a lamp shade, and a modular single charging base having a single charging position configured to be removably interlocked with any of at least two electronic candle modules, whereby the modular single charging based is decoratively configured as a decorative base for the interlocked electronic candle module during continuous lighted used of the interlocked candle module.

* * * * *